US010138356B2

(12) United States Patent
Craenmehr et al.

(10) Patent No.: US 10,138,356 B2
(45) Date of Patent: Nov. 27, 2018

(54) LIQUID COMPOSITION COMPRISING POLYMER CHAINS AND PARTICLES OF AN INORGANIC MATERIAL IN A LIQUID

(75) Inventors: Eric Gerardus Maria Craenmehr, Venlo (NL); Aafke Tessa ten Cate, 's-Hertogenbosch (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 1235 days.

(21) Appl. No.: 12/988,959

(22) PCT Filed: Apr. 24, 2009

(86) PCT No.: PCT/NL2009/050221
§ 371 (c)(1),
(2), (4) Date: Nov. 24, 2010

(87) PCT Pub. No.: WO2009/131454
PCT Pub. Date: Oct. 29, 2009

(65) Prior Publication Data
US 2011/0068289 A1    Mar. 24, 2011

(30) Foreign Application Priority Data
Apr. 25, 2008  (EP) .................................... 08155209

(51) Int. Cl.
*C08K 9/08*    (2006.01)
(52) U.S. Cl.
CPC ...................... *C08K 9/08* (2013.01)
(58) Field of Classification Search
CPC ... C08K 9/08; C08K 3/00; C08K 3/34; C08K 3/346; C08L 79/02; C08L 83/02;
(Continued)

(56) References Cited

U.S. PATENT DOCUMENTS 5,164,055 A * 11/1992 Dubrow ........... G01N 27/44747
204/455
5,229,288 A * 7/1993 Mori et al. ...................... 435/29
(Continued)

FOREIGN PATENT DOCUMENTS

EP    0 359 349 A2 *  3/1990
EP       1160286       5/2001
(Continued)

OTHER PUBLICATIONS

Machine Translation of Publ. No. JP 2006-288217, published Oct. 2006, Japan patent Office, Tokyo, Japan, obtained online @ http://dossier1.ipdl.inpit.go.jp/AIPN/odse_top_dn.ipdl?N0000=7400 (Downloaded Mar. 18, 2013), pp. 1-13.*

(Continued)

*Primary Examiner* — Daniel S Metzmaier
(74) *Attorney, Agent, or Firm* — Lucas & Mercanti, LLP

(57) ABSTRACT

The invention relates to a liquid composition comprising polymer chains and particles of an inorganic material in a liquid, an article comprising said liquid composition, a gel obtained from said liquid composition, an article comprising said gel, and the use of said liquid composition. The liquid composition comprises polymer chains and particles of an inorganic material in a liquid, wherein the polymer chains are linked to particles of the inorganic material by means of a functional group that is present in the polymer chains, wherein the polymer used has a lower critical solution temperature in the liquid used, and wherein the liquid composition exhibits thermo-induced gelation.

34 Claims, 2 Drawing Sheets

(58) Field of Classification Search
CPC ....... C08L 101/00; A61K 47/32; A61K 47/34; A61K 9/06; A62D 1/00
USPC .......................................................... 516/100
See application file for complete search history.

(56) References Cited

U.S. PATENT DOCUMENTS

| | | | | |
|---|---|---|---|---|
| 5,569,364 | A * | 10/1996 | Hooper | G01N 27/44747 204/455 |
| 7,993,892 | B2 * | 8/2011 | Takada et al. | 435/176 |
| 8,257,745 | B2 * | 9/2012 | Ketelson et al. | 424/489 |
| 2001/0049413 | A1 | 12/2001 | Haraguchi | |
| 2002/0119116 | A1 * | 8/2002 | Sahatjian et al. | 424/78.31 |
| 2002/0187173 | A1 * | 12/2002 | L'Alloret et al. | 424/401 |
| 2002/0197231 | A1 * | 12/2002 | L'Alloret et al. | 424/78.02 |
| 2003/0004258 | A1 * | 1/2003 | L'Alloret | 524/500 |
| 2003/0083388 | A1 * | 5/2003 | L'Alloret | 516/10 |
| 2003/0158330 | A1 * | 8/2003 | L'Alloret | 524/801 |
| 2004/0202634 | A1 * | 10/2004 | L'Alloret | 424/70.16 |
| 2004/0220296 | A1 * | 11/2004 | Lowman et al. | 523/113 |
| 2005/0249683 | A1 * | 11/2005 | L'Alloret | 424/61 |
| 2006/0001010 | A1 * | 1/2006 | Yeghiazarian et al. | 252/500 |
| 2007/0135706 | A1 * | 6/2007 | Shimko | A61B 6/12 600/411 |
| 2008/0262519 | A1 * | 10/2008 | Gurtner et al. | 606/153 |

FOREIGN PATENT DOCUMENTS

| | | |
|---|---|---|
| EP | 1595899 | 11/2005 |
| EP | 1 829 896 A1 * | 9/2007 |
| JP | 2002053762 | 2/2002 |
| JP | 2006271252 | 1/2006 |
| JP | 2006028446 | 2/2006 |
| JP | 2006036811 | 2/2006 |
| JP | 2006288217 A * | 10/2006 |
| JP | 2006296257 A * | 11/2006 |
| JP | 200874925 | 4/2008 |
| JP | 2008074925 A * | 4/2008 |
| WO | WO 02/102917 A1 * | 12/2002 |
| WO | WO 03/059194 A2 * | 7/2003 |
| WO | 2004/098756 A2 | 11/2004 |
| WO | WO 2007149999 A2 * | 12/2007 |
| WO | WO 2008/034553 A1 * | 3/2008 |

OTHER PUBLICATIONS

Machine Translation of Publ. No. JP 2006-296257, published Nov. 2006, Japan patent Office, Tokyo, Japan, obtained online @ http://dossier1.ipdl.inpit.go.jp/AIPN/odse_top_dn.ipdl?N0000=7400 (Downloaded Mar. 18, 2013), pp. 1-12.*

Machine Translation of Publ. No. JP 2008-074925, published Apr. 2008, Japan patent Office, Tokyo, Japan, obtained online @ http://dossier1.ipdl.inpit.go.jp/AIPN/odse_top_dn.ipdl?N0000=7400 (Downloaded Mar. 18, 2013), pp. 1-11.*
Handbook of Industrial Surfactants, Michael Ash editor, Gower Publ., Brookfield, VT, USA (copyright 1993), p. 546.*
Lagaly et al., "Sol—gel transitions of sodium montmorillonite dispersions by cationic end-capped poly(ethylene oxides) (surface modification of bentonites, IV)", Colloid and Polymer Science, vol. 284, Issue 9, Jun. 2006, pp. 947-956.*
Derwent Abstract on EAST, week 199939, London: Derwent Publications Ltd., AN 1991-252786, Class A89, WO 9111709 A & U.S. Pat. No. 5,164,055 A (Applied Biosystems / Perkin-Elmer Corp), abstract.*
Database WPI Week 200702 Thomson Scientific, London, GB; AN 2007-011683 XP002493336 & JP 2006 296257 A(ZH Kawamura Rikagaku Kenkyusho) Nov. 2, 2006 (Nov. 2, 2006) abstract.
Haraguchi, K, et al., The Unique Optical and Physical Properties of Soft, Transparent . . . , Liquid Crystals XI, Proc. of SPIE, vol. 6654, No. 1, pp. 665400-1-665400-11, XP002493381, Sep. 13, 2007.
Liang, Liang, et al., Theermosensitive Poly(N-Isoropylacrylamide)-Clay Nanocomposites . . . , Langmuir, vol. 16, pp. 9895-9899, 2000, XP-002419026 , Published on web Nov. 15, 2000.
Bandi, Suneel, et al., Temperature-Responsive Clay Aerogel . . . , Macromolecules, vol. 38, pp. 9216-9220, 2005, XP-002493406 , Published on web Oct. 7, 2005.
Haraguchi, Kazutoshi, et al., Effects of Clay Content on the Properties of Nanocomposite . . . , Macromolecules, vol. 35, pp. 10162-10171, 2002, XP-002493407 , Published on web Dec. 4, 2002.
Haraguchi, Kazutoshi, et al., Novel Manufacturing Process of Nanocomposite . . . , American Society of Mechanical Engineers, Manufacturing engineering Division, MED 2005, vol. 16-1, pp. 119-126, 2005, XP009104941.
Xia, Xiaohu, et al., Swelling and Mechanical Behavior of . . . , Polymer, vol. 44, pp. 3389-3396, 2003 XP004423211.
Database WPI Week 200680 Thomson Scientific, London, GB; AN 2006-786580 XP002493337 & JP 2006 288217 A(ZH Kawamura Rikagaku Kenkyusho) Oct. 26, 2006 (Oct. 26, 2006) abstract.
Toru Takehisa, et al., Supporting of Physiologically Active Materials by Nanocomposite . . . , Proceedings of Japanese Society for Biomaterials, 29, pp. 232, 2007, English Translation only, source on translation unknown.
Toru Takehisa, et al., Development of Nanocomposite Hydrogels for Medical ISE Control . . . , Proceedings of the Society of Polymer Science, 54 (2), pp. 4727-4728, 2005, English Translation only, source on translation translation unknown.
Toru Takehisa, et al., Development of Nanocomposite Hydrogels . . . , Proceedings of Symposium on Polymer Gels, 15, pp. 95-96, 2004, English Translation only, source on translation unknown.

* cited by examiner

LIQUID COMPOSITION COMPRISING POLYMER CHAINS AND PARTICLES OF AN INORGANIC MATERIAL IN A LIQUID

CROSS-REFERENCE TO RELATED APPLICATION

This application is a 371 of PCT/NL2009/050221 filed Apr. 24, 2009, which claims the benefit of European Patent Application No. 08155209.3, filed Apr. 25, 2008, the contents of each of which are incorporated herein by reference.

BACKGROUND OF THE INVENTION

Field of the Invention

The invention relates to a liquid composition comprising polymer chains and particles of an inorganic material in a liquid, an article comprising said liquid composition, a gel obtained from said liquid composition, an article comprising said gel, and the use of said liquid composition.

From WO-A-2004/098756 thermogelling hydrogels are known that comprise polymer blends of two different polymers, i.e. a copolymer of poly(N-isopropyl acrylamide) and a hydrophilic polymer such as for example poly(vinyl alcohol) or polyethylene glycol. The polymer blends described in said document solidify from a liquid at room temperature to form a solid at body temperature. Such polymer blends can be used to implant a hydrogel into a body by injecting a polymer blend as a liquid below body temperature into a selected site in a body where the polymer blend then forms a solid hydrogel in the body as the implant warms to body temperature. The solidification of the polymer blend is believed to be the result of interchain hydrogen bonding between the hydroxyl groups on the hydrophilic polymer and the acrylamide groups on the poly(N-isopropyl acrylamide). Said hydrogels can be used for a variety of medical implantation purposes. The respective concentrations of the polymers to be used are, however, relatively high when compared to the water content of the blends, which make these blends relatively expensive. Moreover, it may be desired that the implants to be obtained display additional functionalities such as, for example, slow release of pharmaceutical ingredients at the locality of the implant. However, the functionality enhancement of such polymer blends requires the covalent bonding of chemical groups which display the required functionality, for which relatively complex processes are needed which allow little flexibility.

SUMMARY OF THE INVENTION

The object of the invention is to provide a composition which can be used in a similar way in, for instance, implants, but which is less expensive, easier to prepare, and which attractively allows its functionality to be enhanced in a simple manner.

Surprisingly, it has now been found that this can be realised when use is made of a liquid composition which comprises chains of a particular polymer and particles of an inorganic material in a liquid.

Accordingly, the invention relates to a liquid composition comprising polymer chains and particles of an inorganic material in a liquid, wherein the polymer chains are linked to particles of the inorganic material by means of a functional group that is present in the polymer chains, wherein the polymer used has a lower critical solution temperature in the liquid used, and wherein the liquid composition exhibits thermo-induced gelation.

The liquid composition of the invention has the advantages that it can be prepared very easily, it requires smaller amounts of expensive materials, and allows for simple implementation of various functionalities. Moreover, the use of the inorganic particles allows for the formation of gels having particular or self-assembling structures, or gels having bone stimulating properties.

DETAILED DESCRIPTION OF THE INVENTION

In the liquid composition according to the invention, polymer chains are linked to the particles of the inorganic material by means of a functional group that is present in the polymer chains. The linkage between the polymer and the inorganic particles can be either physical or chemical in nature, e.g. an ionic, covalent or coordinative linkage or hydrogen bonding.

The polymer to be used in accordance with the invention has a lower critical solution temperature (LCST) in the liquid used. This means that the polymer exhibits lower critical solution temperature behaviour in the liquid. As will be understood by the skilled person, at a temperature below the LCST the polymer will display hydrophilic properties as a result of which the liquid composition will be a liquid. At a temperature similar to or above the LCST the polymer will display hydrophobic properties as a result of which the liquid composition will exhibit gelation. In other words, above the LCST the liquid composition will become a gel. Hence, the liquid composition of the invention shows thermo-induced gelation.

Preferably, the liquid composition according to the invention exhibits reversible thermal gelation properties. This means that the liquid composition will become a gel when the temperature of the composition is increased above the LCST of the polymer, whereas the composition will turn from the gel so obtained into a liquid again when the temperature of the composition is decreased below the LCST of the polymer. In this respect it is noted that in some embodiments of the invention the gel will not turn into a liquid again when the temperature of the gel has been decreased below the LCST of the polymer. This has for instance been observed for the embodiments in which polymer chains with more than one functional group were linked to a (synthetic) clay such as Laponite. It is believed that the irreversibility of the gelation is caused by a rearrangement of the polymer chains linked to the inorganic particles, leading to cross-linking of the system, which then remains a gel upon cooling below the LCST of the polymer. Irreversible thermal gelation is not observed for polymer chains having only one functional group to be linked to the inorganic particles.

Figure 1A:
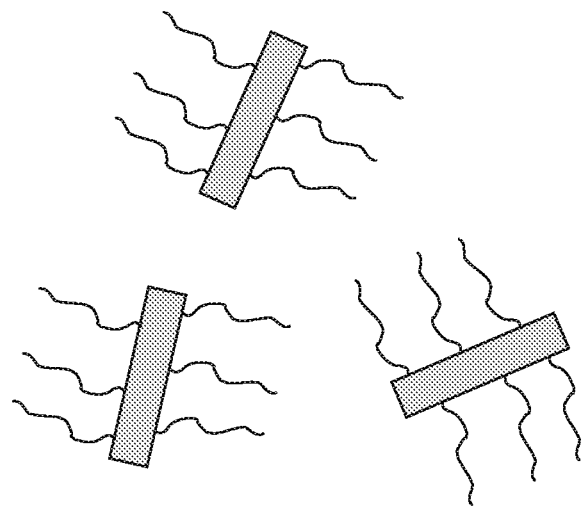
FIGS. 1A, 1B 1C and 1D are schematic representations of polymers in accordance with the present invention.
Figure 1B:
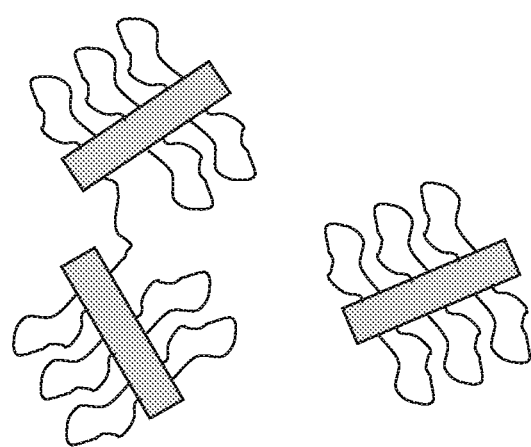
Figure 1C:
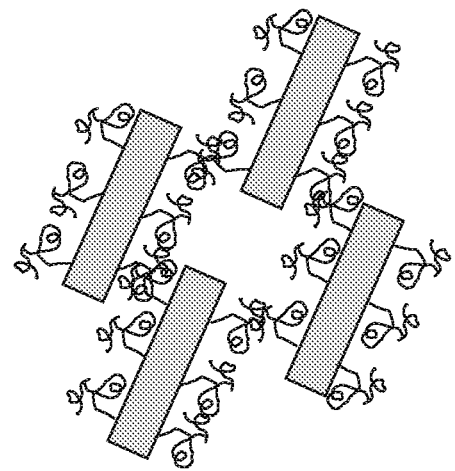
Figure 1D:
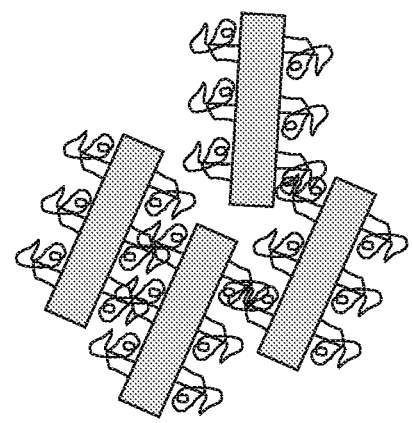

Without wishing to be bound by theory, the inventors believe that upon mixing of the inorganic particles with the polymer solution at a temperature below the LCST, the polymer chains form a linkage with the inorganic particles in such a way that the polymers are linked to inorganic particles, but that the inorganic particles are not interconnected to a large extent (i.e. there is no cross-linked system in which the inorganic particles are cross-linked through the polymers). This situation is schematically shown in FIGS. 1A and 1B. In FIG. 1A polymers are linked with only one functional group to the particles, which does not lead to interconnection of distinct particles. In FIG. 1B, polymers are linked with more than one functional group to the particles, but there is only very limited interconnection between distinct particles. In both cases, the system as a whole remains liquid. Upon heating to a temperature above the LCST, the polymer chains become more hydrophobic as a result of their LCST and will assemble with other polymer chains. When polymer chains linked to distinct inorganic particles (i.e. one polymer chain linked to one inorganic particle and another polymer chain linked to another inorganic particle) assemble together, they form a kind of physical cross-links, which interconnect the two distinct inorganic particles. Thus, at a temperature above the LCST, distinct inorganic particles are cross-linked by the polymer chains that are linked to each of them. This situation is schematically shown in FIGS. 1C and 1D. The cross-linked system thus formed will not be soluble in the liquid anymore, but will form a gel holding part or all of the liquid inside.

Suitably, the particles of the inorganic material are interconnected by a polymer chain to on average no more than two other particles of the inorganic material. In the context of the invention the terms "on average" means that the number average of other inorganic particles interconnected to any inorganic particle is no more than two, not counting inorganic particles that are not interconnected to any other particles. In effect, this means that the inorganic particles do not form a cross-linked network with the polymer chains.

Preferably, at least 90% of the particles of the inorganic material are not interconnected to other particles of the inorganic material.

In the liquid composition of the invention, the ratio of the functional groups on the polymer chains (A) and the ion exchange capacity of the particles (B) is smaller than 1.1 (A/B). This means that only a small amount of the inorganic material needs to be used when compared with the amount of polymer.

Preferably, the ratio of the functional groups on the polymer chains (A) and the ion exchange capacity of the particles (B) is smaller than 1.0 (A/B).

Suitably, the liquid is present in an amount in the range of 60-99 wt. %, based on total composition. Preferably, the liquid is present in an amount in the range of 70-98 wt. %, based on total composition.

Suitably, liquid comprises water and one or more solvents. Preferably, water is present in an amount of more than 50 wt. % based on total liquid. Suitably, the one or more solvents are selected from the group consisting of ethylene glycol, methanol, ethanol, propanol, isopropanol, butanol, tert-butanol formic acid, acetic acid, dimethylformamide, dimethylsulfoxide, acetone, tetrahydrofuran and dioxane. In a preferred embodiment of the invention, the liquid comprises water and ethylene glycol. In another preferred embodiment, the liquid consists of water. In an embodiment, the liquid comprises salts or other solutes.

The lower critical solution temperature of the polymer to be used in the invention is suitably in the range of from $-40°$ C. to $300°$ C.; preferably, the lower critical solution temperature of the polymer is in the range of from $-20°$ C. to $100°$ C.

The polymer to be used in accordance with the invention can suitably be selected from the group consisting of polymers and copolymers of acrylamides, methacrylamides, methacrylic acid, hydroxyalkylacrylates, hydroxyalkylmethacrylates, allylamine, oligo(ethylene glycol)methacrylates and N-vinyl-N,N-disubstituted amides (such as N-vinylcaprolactam or vinyl ethylimidazole), polymers and copolymers of ethylene glycol and propylene glycol, surfactants containing oligo(ethylene glycol), polymers and copolymers of vinyl acetate and vinyl alcohol, and cellulose derivatives. The polymer to be used in accordance with the invention incorporates one or more functional groups which can be linked to the inorganic particles.

The functional group(s) present in the polymer chains can suitably be chosen from the group consisting of hydroxyl, amine, epoxide, acid, anhydride, ammonium, carboxylate, sulphate, sulphonate, sulphinate, silane, phosphate, phosphonate, phosphinate, phosphite, phosphinite, sulphide, disulphide, maleic acid, phosphine, phosphine oxide, phosphonium, sulphonium, oxonium, ether, or aldehyde.

Preferably, the polymer to be used in the liquid composition according to the invention comprises amino-terminated poly(N-isopropylacrylamide), sulphonate-terminated poly(N-isopropylacrylamide), poly(N-isopropylacrylamide-co-allylamine), poly(N-isopropylacrylamide-co-trimethylaminoethylmethacrylate), poly(N-isopropylacrylamide-co-4-vinylbenzenesulphonate), or polyetheramine.

The polymer chains in the liquid composition of the invention have suitably a number average molecular weight in the range of from 500 to 100 000 Dalton. Preferably, the polymer chains have a number average molecular weight in the range of from 1000 to 10 000 Dalton.

The particles used in accordance with the invention are derived from an inorganic material. Suitably, the inorganic material is selected from the group consisting of minerals, silicates, metal oxides, synthetic clays, and layered double hydroxides. Preferably, the inorganic material comprises hydrotalcite, smectite, laponite, bentonite, hectorite, saponite, vermiculite, chlorite, sepiolite, palygorsite or magadiite. More preferably, the inorganic material comprises hydrotalcite, laponite, bentonite or hectorite.

The particles of the inorganic material to be used in accordance with the invention suitably have an average largest diameter in the range of 25 nm to 5 µm. Preferably, the particles of the inorganic material have an average largest diameter in the range of 50 nm to 2 µm.

The particles of the inorganic material suitably have an aspect ratio in the range of from 20-2000. Preferably, the particles of the inorganic material have an aspect ratio in the range of from 50-1000.

In a further aspect the invention is directed to an article comprising the liquid composition of the invention. The article can for instance be a fire extinguishing fluid, a sensor or a culturing medium. A fire extinguishing fluid comprising the liquid composition of the invention was found to be particularly interesting. In liquid form the fire extinguishing fluid can easily be sprayed or spouted. After being sprayed or spouted, the liquid composition of the invention turns into a gel due to the heat of the fire. The nanoparticles used in the liquid composition and present in the gel advantageously have flame-retardant properties as such. This fire extinguishing fluid can be used for fire fighting of bush fires, fires of utility buildings and other fires, as well as for fire prevention and protection of the objects next to the fire. The fire extinguishing fluid achieves efficient cooling due to the stickiness of the self-gelling liquid on these objects. Therefore, no water flushes away and water evaporates on the surfaces and thereby efficiently cools down the objects. The liquid does not flow down to the soil or lower floors which prevents water damage on these floors.

In a further aspect, the invention is directed to a gel obtained by increasing the temperature of the liquid composition of the invention above the lower critical solution temperature of the polymer used.

In addition, the invention provides an article which comprises the gel of the invention. Suitably, such an article is an implant, a sensor, a scaffold, a sensor, or a culture medium for cell culturing. For example, the invention enables an injectable implant or an injectable scaffold comprising the liquid composition of the present invention. Upon injection of the injectable implant or injectable scaffold into the body of a subject (such as a mammal, more preferably a human), the liquid composition can turn into a gel as a consequence of the body heat of the subject, thereby forming a useful implant or scaffold without the need of serious surgery.

Further, the invention is directed to the use of the liquid composition of the invention for the preparation of an implant, a sensor, a culture medium for cell culturing, or a fire extinguishing fluid. The liquid composition of the invention may also be used in the preparation of a fire protection fluid and/or a fire prevention fluid, which can for instance be applied on hot objects.

EXAMPLES

Example 1

0.50 g of mono-amine terminated poly(ethylene oxide-co-propylene oxide) (Jeffamine M2005) was dissolved in 50 ml demi-water and acidified with 1.0 M hydrochloric acid while stirring with a magnetic stirring bar. 1.0 g of Laponite was added and again the product was acidified with 1.0 M hydrochloric acid. The mixture was stirred for 16 h to exfoliate the Laponite. When the resulting product was warmed up to 50° C., it turned into a solid gel. When cooling down the product, it became liquid again. With an Anton Paar rheometer the storage modulus G' was measured with a plate-plate configuration at 1 Hz while heating up the product. Due to the gelation G' changes from 0.1 mPa (under LCST) to 0.1 kPa (above LCST).

Example 2

0.50 g of bis-amine terminated poly(ethylene oxide-co-propylene oxide) (Jeffamine D2000) was dissolved in 50 ml demi-water and acidified with 1.0 M hydrochloric acid while stirring with a magnetic stirring bar. 2.0 g of Laponite was added and again the product was acidified with 1.0 M hydrochloric acid. The mixture was stirred for 16 h to exfoliate the Laponite. When the resulting product was warmed up to 50° C., it turned into a solid gel. When cooling down the product it remained a solid gel.

Example 3

0.25 g of amine-terminated poly(N-isopropylacrylamide) was dissolved in 2.5 ml demi-water and 0.06 g of Bentonite was added while stirring with a magnetic stirring bar. When the Bentonite had been exfoliated a part of the product was warmed up. Hereafter this was a solid gel. When cooling down the product it was liquid again.

Example 4

0.37 g of poly(N-isopropylacrylamide-co-allylamine) was dissolved in 18.5 ml demi-water and 0.08 g of Laponite was added while stirring with a magnetic stirring bar. When the Laponite has been exfoliated a part of the product was warmed up. Hereafter this was a solid gel. When cooling down the product became liquid again. With an Anton Paar rheometer the storage modulus G' was measured with a plate-plate configuration at 1 Hz while heating up the product. Due to the gelation G' changes from 0.01 mPa (under LCST) to 0.1 kPa (above LCST).

Example 5

2.0 g of sulphonate-terminated poly(N-isopropylacrylamide) was dissolved in 10 ml $CO_2$-free demineralised water and 0.15 g of a calcinated hydrotalcite (Mg:Al 3:1) was added while stirring with a magnetic stirring bar under nitrogen. The mixture was stirred for 18 h under nitrogen. When a part of the resulting product was warmed up, it turned into a solid gel. When cooling down, the product became liquid again. With an Anton Paar rheometer the storage modulus G' was measured with a plate-plate configuration at 1 Hz while heating up the product. Due to the gelation G' changes from 10 Pa (under LCST) to 1 kPa (above LCST).

Example 6

1.0 g of poly(N-isopropylacrylamide-co-4-vinylbenzenesulphonate) was dissolved in 30 ml $CO_2$-free demineralised water and 0.04 g of a calcinated hydrotalcite (Mg:Al 3:1) was added while stirring with a magnetic stirring bar under nitrogen. The mixture was stirred for 18 h under nitrogen. When a part of the resulting product was warmed up, it turned into a solid gel. Upon cooling the product became liquid again. With an Anton Paar rheometer the storage modulus G' was measured with a plate-plate configuration at 1 Hz while heating up the product. Due to the gelation G' changes from 0.1 Pa (under LCST) to 50 Pa (above LCST).

Example 7

0.30 g of poly(N-isopropylacrylamide-co-4-vinylbenzenesulphonate) was dissolved in 10 ml $CO_2$-free demineralised water and 0.014 g of a calcinated hydrotalcite (Mg:Fe 3:1) was added while stirring with a magnetic stirring bar. The mixture was stirred for 18 h. When a part of the resulting product was warmed up, it turned into a solid gel. Upon cooling the product became liquid again.

Example 8

The cold liquid of Example 1 was sprayed on a hot metal surface by a spray gun. Immediately, the liquid got sticky and solidified into a hydrogel when it hit the surface. The evaporation of the whole amount of water which has been sprayed took place at the surface of the hot plate without any amount of water flushing away.

Example 9

25 g of the cold liquid of Example 1 was sprayed by a spray gun on a wooden bar (7×20×0.5cm) which was put in fire with a gas burner. The same was done simultaneously with 25 g of water on an identical wooden bar. The fire of both bars went out but while the gas burner was still on, the bar extinguished with water was on fire far more rapidly than the bar which was extinguished with the liquid of Example 1. The recorded temperature of the bar extinguished with the liquid of Example 1 was 100° C. less than the bar extinguished with water. The bar extinguished with water almost burnt completely in 15 min, while the bar extinguished with the liquid of Example 1 was only partially charred.

The invention claimed is:

1. A liquid composition comprising polymer chains and particles of an inorganic material in a liquid, the polymer chains comprising a functional group, wherein
the polymer chains are linked to particles of the inorganic material by means of the functional group that is present in the polymer chains;
the functional group is selected from the group consisting of amine, epoxide, acid, anhydride, ammonium, carboxylate, sulfate, sulfonate, sulfinate, silane, phosphate, phosphonate, phosphinate, phosphite, phosphinite, sulfide, disulfide, maleic acid, phosphine, phosphine oxide, phosphonium, sulphonium, oxonium, and aldehyde;
the polymer chains have a number average molecular weight in the range of 500 to 100,000 Dalton;
the polymer used has a lower critical solution temperature in the range of −20° C. to 100° C. in the liquid used;
the liquid composition exhibits thermo-induced gelation; and
the inorganic material is selected from the group consisting of minerals, silicates, metal oxides, clays, synthetic clays, and layered double hydroxides.

2. The composition according to claim 1, wherein the composition exhibits reversible thermal gelation.

3. The composition according to claim 1, wherein the ratio of the functional groups on the polymer chains (A) and the ion exchange capacity of the particles (B) is smaller than 1.1 (A/B),
wherein
the particles are selected from the group consisting of clay particles, synthetic clay particles, or layered double hydroxide, and
the linkage between the polymer chains and the particles comprises ionic bonding.

4. The composition according to claim 3, wherein the ratio of the functional groups on the polymer chains (A) and the ion exchange capacity of the particles (B) is smaller than 1.0 (A/B).

5. The composition according to claim 1, wherein the liquid is present in an amount in the range of 60-99 wt. %, based on total composition.

6. The composition according to claim 1, wherein the liquid comprises water with one or more organic solvents.

7. The composition according to claim 6, wherein in the water is present in an amount of more than 50 wt. %, based on total liquid.

8. The composition according to claim 6, wherein the one or more solvents are selected from the group consisting of ethylene glycol, methanol, ethanol, propanol, isopropanol, butanol, tert-butanol, formic acid, acetic acid, dimethylformamide, dimethylsulfoxide, acetone, tetrahydrofuran and dioxane.

9. The composition according to claim 6, wherein the liquid comprises water and ethylene glycol.

10. The composition according to claim 1, wherein the liquid consists of water.

11. The composition according to claim 1, wherein the polymer is selected from the group consisting of polymers and copolymers of acrylamides, methacrylamides, methacrylic acid, hydroxyalkylacrylates, hydroxyalkylmethacrylates, allylamine, oligo(ethylene glycol)methacrylates and N-vinyl-N,N-disubstituted amides, copolymers of ethylene glycol and polymers and copolymers of propylene glycol, surfactants containing oligo(ethylene glycol), polymers and copolymers of vinyl acetate, polymer and copolymers of vinyl alcohol, and cellulose derivatives.

12. The composition according to claim 1, wherein the polymer chains have a number average molecular weight in the range of from 1,000-100,000 Dalton.

13. The composition according to claim 12, wherein the polymer chains have a number average molecular weight in the range of from 1,000-10,000 Dalton.

14. The composition according to claim 1, wherein the particles are clays, synthetic clays or layered double hydroxides, and wherein the particles have an average largest diameter in the range of from 25 nm-5 µm.

15. The composition according to claim 1, wherein the particles have an aspect ratio in the range of from 20-2000.

16. A gel obtained by increasing the temperature of the composition according to claim 1 above the lower critical solution temperature of the polymer.

17. The composition according to claim 1, wherein the inorganic particles do not form a cross-linked network with the polymer chains.

18. The composition according to claim 1, wherein the functional group is selected from the group consisting of amine, ammonium, carboxylate, and sulfonate.

19. A method for preparing a liquid composition according to claim 1, comprising mixing particles of an inorganic material with a solution of a polymer having polymer chains wherein a functional group is present and which polymer has a Lower Critical Solution Temperature (LCST) in the solution, said mixing carried out at a temperature below said lower critical solution temperature.

20. A method for preparing a gel from a liquid composition according to claim 1, comprising increasing the temperature of the liquid composition above the LCST of the polymer.

21. The composition according to claim 1, wherein the liquid is present in an amount in the range of 70-98 wt. %.

22. The composition according to claim 1, wherein the polymer is selected from the group consisting of amino-terminated poly(N-isopropylacrylamide), sulphonate-terminated poly(N-isopropylacrylamide), poly(N-isopropylacrylamide-co-allylamine), poly(N-isopropylacrylamide-co-trimethylaminoethylmethacrylate), poly(N-isopropylacrylamide-co-4-vinylbenzenesulphonate), and polyetheramine.

23. The composition according to claim 1, wherein the inorganic material is selected from the group consisting of hydrotalcite, smectite, laponite, bentonite, hectorite, saponite, vermiculite, chlorite, sepiolite, palygorsite, magadiite, and layered double hydroxide.

24. The composition according to claim 1, wherein the inorganic material is selected from the group consisting of hydrotalcite, laponite, bentonite, hectorite, and layered double hydroxide.

25. The composition according to claim 1, wherein the particles have an aspect ratio in the range of from 50-1000.

26. A method for fire protection or fire prevention, comprising spraying on a fire or a hot object a liquid composition according to claim 1.

27. The composition according to claim 1, wherein the functional group is selected from the group consisting of amine, ammonium, carboxylate, and sulfonate, wherein
the polymer chains have one functional group to be linked with the inorganic particle per polymer chain without leading to interconnection of distinct particles, and
the inorganic material comprises one or more selected from the group consisting of synthetic clays, layered double hydroxides, hydrotalcite, smectite, laponite, bentonite, hectorite, saponite, vermiculite, chlorite, sepiolite, palygorsite and magadiite.

28. The composition according to claim 1, wherein the functional group is selected from the group consisting of amine, ammonium, carboxylate, and sulfonate, and the polymer chains have a number average molecular weight in the range of from 1000 to 10000.

29. An article comprising a liquid composition comprising polymer chains and particles of an inorganic material in a liquid, the polymer chains comprising a functional group, wherein
the polymer chains are linked to particles of the inorganic material by means of the functional group that is present in the polymer chains;
the functional group is selected from the group consisting of amine, epoxide, acid, anhydride, ammonium, carboxylate, sulfate, sulfonate, sulfinate, silane, phosphate, phosphonate, phosphinate, phosphite, phosphinite, sulfide, disulfide, maleic acid, phosphine, phosphine oxide, phosphonium, sulfonium, oxonium, and aldehyde;
the polymer chains have a number average molecular weight in the range of about 500 to 100,000 Dalton;
the polymer used has a lower critical solution temperature in the range of −20° C. to 100° C. in the liquid used; and
the liquid composition exhibits thermo-induced gelation, and
wherein the article is an implant, a scaffold, a sensor, or a fire extinguishing fluid.

30. The article according to claim 29, wherein the article is an injectable liquid implant or scaffold suitable for injection into the body of a human subject, wherein the injectable liquid implant or scaffold after injection into the body of the human subject exhibits thermo-induced gelation as a consequence of the body heat of the human subject to form a solid implant or solid scaffold in the body of the human subject, wherein the solid implant or solid scaffold displays slow release of the pharmaceutical ingredient at the locality of the solid implant or solid scaffold in the body of the human subject.

31. An article comprising a gel obtained by increasing the temperature of a liquid composition above the lower critical solution temperature of a polymer used therein, the liquid composition comprising polymer chains and particles of an inorganic material in a liquid, the polymer chains comprising a functional group, wherein
the polymer chains are linked to particles of the inorganic material by means of the functional group that is present in the polymer chains;
the functional group is selected from the group consisting of amine, epoxide, acid, anhydride, ammonium, carboxylate, sulfate, sulfonate, sulfinate, silane, phosphate, phosphonate, phosphinate, phosphite, phosphinite, sulfide, disulfide, maleic acid, phosphine, phosphine oxide, phosphonium, sulfonium, oxonium, and aldehyde;
the polymer chains have a number average molecular weight in the range of about 500 to 100,000 Dalton;
the polymer used has a lower critical solution temperature in the range of −20° C. to 100° C. in the liquid used; and
the liquid composition exhibits thermo-induced gelation, and
wherein the article is an implant, a scaffold, a sensor, or a culture medium for cell culturing.

32. The article according to claim 31, which article is an implant wherein the implant displays slow release of pharmaceutical ingredients at the locality of the implant.

33. A liquid composition comprising polymer chains and particles of an inorganic material in a liquid, the polymer chains comprising a functional group, wherein
the polymer chains are linked to particles of the inorganic material by means of the functional group that is present in the polymer chains;
the functional group is selected from the group consisting of amine, epoxide, acid, anhydride, ammonium, carboxylate, sulfate, sulfonate, sulfinate, silane, phosphate, phosphonate, phosphinate, phosphite, phosphinite, sulfide, disulfide, maleic acid, phosphine, phosphine oxide, phosphonium, sulphonium, oxonium, and aldehyde;
the polymer chains have a number average molecular weight in the range of 500 to 100,000 Dalton;
the polymer used has a lower critical solution temperature in the range of −20° C. to 100° C. in the liquid used;
the liquid composition exhibits thermo-induced gelation; and
wherein the particles have an average largest diameter in the range of from 50 nm-2 µm.

34. A liquid composition comprising polymer chains and particles of an inorganic material in a liquid, the polymer chains comprising a functional group, wherein:
the polymer chains are linked to particles of the inorganic material by means of the functional group that is present in the polymer chains;
the functional group is selected from the group consisting of amine, epoxide, acid, anhydride, ammonium, carboxylate, sulfate, sulfonate, sulfinate, silane, phosphate, phosphonate, phosphinate, phosphite, phosphinite, sulfide, disulfide, maleic acid, phosphine, phosphine oxide, phosphonium, sulphonium, oxonium, and aldehyde;
the polymer chains have a number average molecular weight in the range of 500 to 100,000 Dalton;
the polymer has a lower critical solution temperature in the liquid;
the liquid composition exhibits thermo-induced gelation;
the inorganic material comprises one or more selected from the group consisting of synthetic clays, layered double hydroxides, hydrotalcite, smectite, laponite, bentonite, hectorite, saponite, vermiculite, chlorite, sepiolite, palygorsite and magadiite; and
the polymer is selected from the group consisting of polymers and copolymers of acrylamides, methacrylamides, methacrylic acid, hydroxyalkylacrylates, hydroxyalkylmethacrylates, allylamine, oligo(ethylene glycol)methacrylates and N-vinyl-N,N-disubstituted amides, polymers and copolymers of vinyl acetate, polymers and copolymers vinyl alcohol, and cellulose derivatives.

* * * * *